Feb. 3, 1925. 1,525,024
W. H. CARRIER
OPERATING MECHANISM FOR DAMPERS AND OTHER CLOSURE MEMBERS
Filed March 23, 1922 2 Sheets-Sheet 2
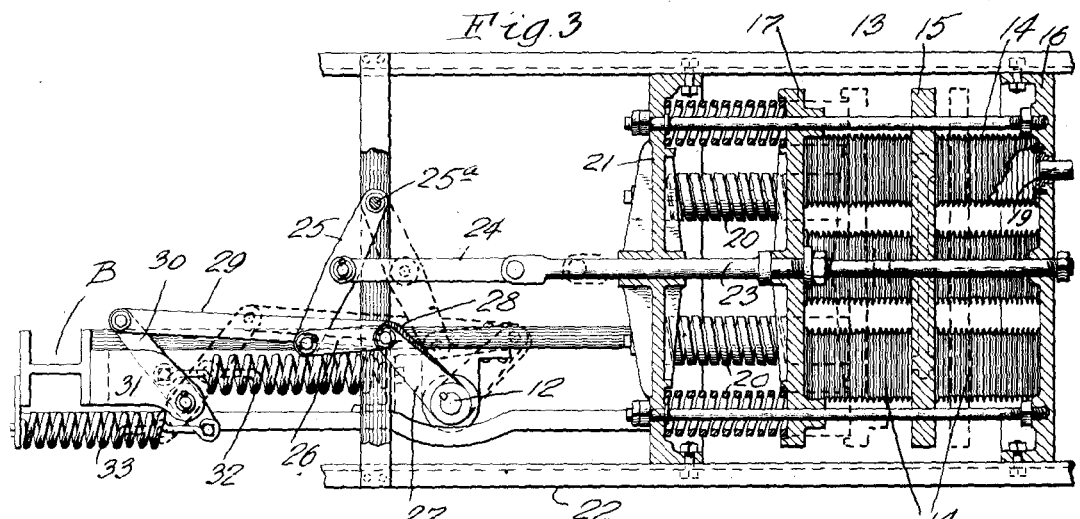
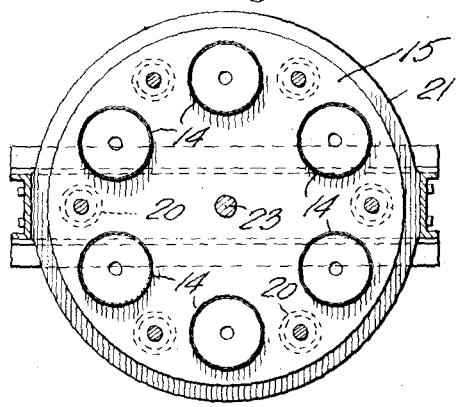
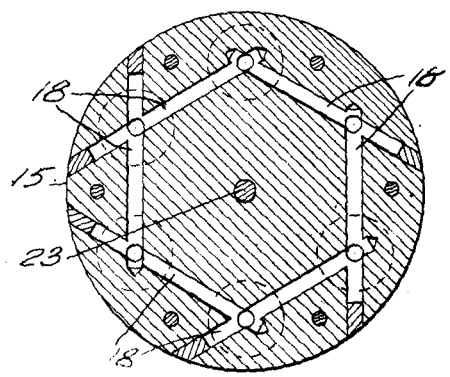
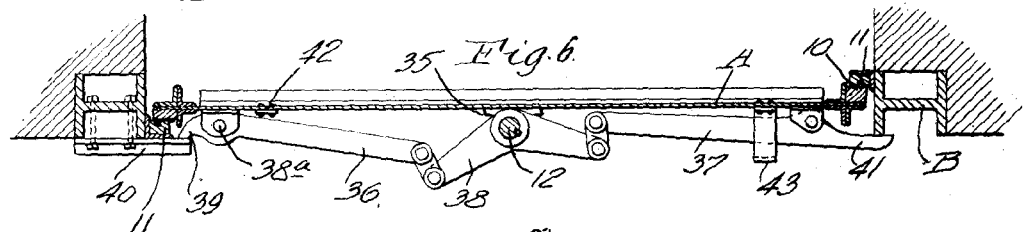
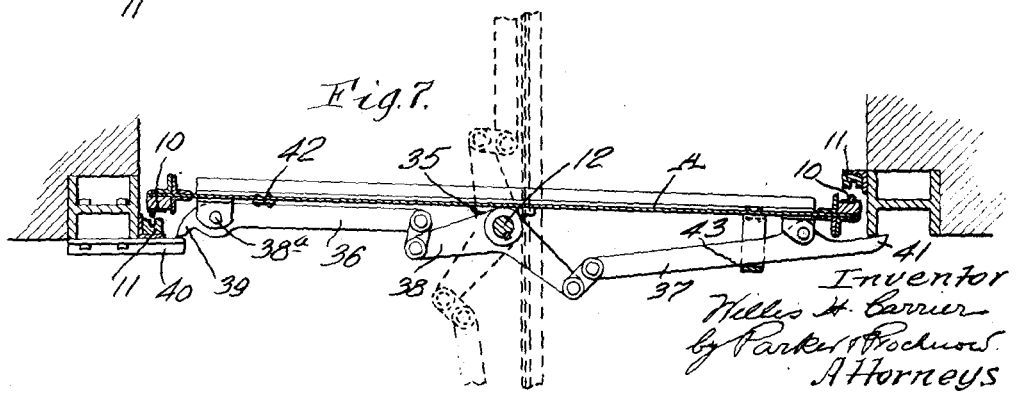

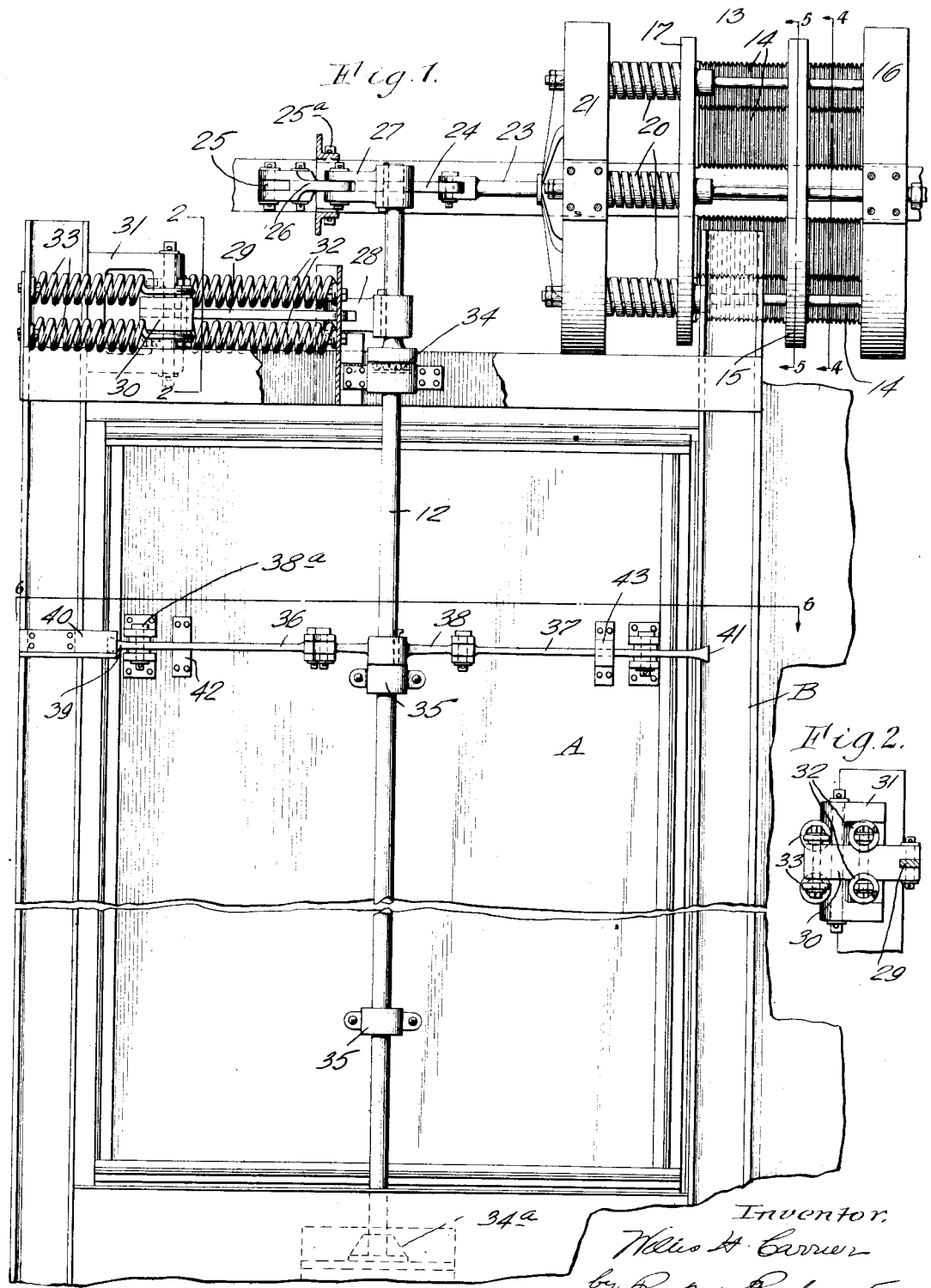

Patented Feb. 3, 1925.

1,525,024

UNITED STATES PATENT OFFICE.

WILLIS H. CARRIER, OF ESSEX FELLS, NEW JERSEY, ASSIGNOR TO CARRIER ENGINEERING CORPORATION, OF NEWARK, NEW JERSEY.

OPERATING MECHANISM FOR DAMPERS AND OTHER CLOSURE MEMBERS.

Application filed March 23, 1922. Serial No. 546,191.

*To all whom it may concern:*

Be it known that I, WILLIS H. CARRIER, a citizen of the United States, residing at Essex Fells, in the county of Essex and State of New Jersey, have invented a new and useful Improvement in Operating Mechanism for Dampers and Other Closure Members, of which the following is a specification.

This invention relates to mechanisms for automatically opening or operating dampers, doors and analogous closure members.

In my application for patent filed July 28, 1921, Serial No. 488,116, is disclosed an air cooling system for electric generators, in which the air used for cooling the generator is recirculated in a closed system or circuit and is passed through the generator again and again, the air being cooled to the temperature necessary for cooling the generator by water sprayed into the circulating air. In said system provision is made for admitting outside air when the cooling system is not functioning properly, as for instance in case the supply of water used for cooling the air should be reduced or fail from any cause. Outside air inlet and relief openings controlled by dampers are provided in the system, the dampers being opened automatically for the admission of outside air and the relief of air from the system, for cooling the generator when the supply of spray water fails or the recirculation of air in the closed system will not produce adequate cooling of the generator. Such dampers are preferably provided with interfitting weather strips or other means for ensuring tight closures of the outside air openings to prevent the leakage of the outside air, which is dirty, into the circulating system when the system is functioning properly, and since the dampers are therefore apt to stick, and being exposed to the outside temperature, are also liable to become frozen in cold weather, it is necessary to construct the damper-operating mechanism so as to pry open or forcibly start the opening movement of dampers to insure a ready and prompt opening of the dampers.

While this invention is primarily designed for operating dampers in a cooling system, such as explained, the invention is not restricted in application to this purpose, but is applicable to dampers, doors or the like used for other purposes, where it is desirable to automatically open or operate the dampers or doors, and also to insure the prompt opening of the same in case they should stick or require considerable force to start the opening movement of the dampers or doors.

The objects of this invention are to provide a practical and dependable operating mechanism for dampers, doors or the like adapted to accomplish the results mentioned, and also to improve automatic operating mechanism for dampers, doors and the like in the respects hereindescribed and set forth in the claims.

In the accompanying drawings:

Fig. 1 is a front elevation of a damper and automatic operating mechanism therefor embodying the invention.

Fig. 2 is a sectional elevation of the operating mechanism on line 2—2, Fig. 1.

Fig. 3 is a plan view, partly in horizontal section of the damper-operating mechanism.

Fig. 4 is a transverse sectional elevation of the mechanism on line 4—4, Fig. 1.

Fig. 5 is a transverse section thereof on line 5—5, Fig. 1.

Fig. 6 is a sectional plan view on line 6—6, Fig. 1, showing the damper and the lever mechanism for prying the same open.

Fig. 7 is a similar view showing by full and broken lines the position of the parts when the damper has been started or partially opened and when it has been fully opened.

A represents a damper or door and B the frame surrounding the opening controlled by the damper. The damper and frame may be of any suitable construction, but preferably the damper and frame are provided with cooperating weather strips or parts at the edges of the damper for insuring a tight closure of the opening when the damper is closed. As shown, the damper is mounted to turn horizontally by means of a central, vertical operating shaft, and is provided at its edges with weather strips 10 provided with lips adapted to enter grooves in cooperating weather strips 11, attached to the damper frame. The damper operating shaft 12 is actuated by a suitable actuating device preferably consisting of a power-operated motor 13 which is so constructed that when it is connected with a source of water or other fluid under pressure, the fluid pressure will retain the damper closed, and when the fluid pressure fails or is reduced to a predetermined minimum, the damper-operating mechanism will act automatically to open the damper.

In the preferred construction of the damper-operating mechanism shown in the drawings, the motor consists of a plurality of expansible bellows diaphragms 14, which are arranged in two groups at opposite sides of an intermediate movable plate or head 15 to which the adjacent ends of all of the diaphragms are connected. The opposite or outer ends of one group of diaphragms bear against or are attached to a stationary head or abutment 16, and the outer ends of the other group of diaphragms are connected to or bear against an outer, movable head 17. The several diaphragms are placed in communication with each other, preferably by suitable passages 18 in the intermediate head 15, and water or other fluid under pressure is admitted to the diaphragms through a suitable pipe or connection 19 connected to the stationary end of one of the diaphragms. The water or fluid under pressure thus admitted to the diaphragms expands the same and moves the outer movable member 17 outwardly or away from the stationary head or abutment 16, this movement of the movable head by the fluid pressure being yieldingly opposed by suitable means, preferably consisting of coil springs 20 arranged between the movable member 17 and a suitable stationary abutment or plate 21. As shown, the stationary head 16 and the abutment 21 are connected by bolts or rods which pass through holes in and form guides for the movable heads 15 and 17. These rods also, as shown, preferably extend through the coil springs and prevent displacement of the latter. The stationary head 16 and the abutment 21 of the motor are also preferably bolted or otherwise suitably secured to a frame 22 by which the motor is supported. The movable head 17 of the motor is connected as by a rod 23 and a link 24, to a lever 25 which is suitably pivoted at 25ª on the frame 22 and is connected as by a link 26 at its free end to a rock arm 27 secured on the damper-operating shaft 12 so that the latter is adapted to be turned or rocked when the movable head 17 of the motor is moved as explained.

The damper-operating shaft 12 is also preferably provided with a rock arm 28 connected by a link 29 to a lever 30. This lever is suitably pivoted on a stationary supporting bracket or frame 31 of any suitable form, and is acted upon by two pairs of springs 32 and 33 which are connected with the lever at opposite sides of its fulcrum. As shown, each pair of springs is attached at one end to the lever 30 and at the opposite end to the supporting frame or other stationary part. These springs cooperate with the motor springs 20 and tend to rock the damper-operating shaft in a direction to open the damper, this actuation of the shaft by the springs being prevented by the motor so long as the actuating water or fluid for the motor has the required pressure.

Preferably the shaft 12 is not rigidly secured to the damper but is journalled in suitable upper and lower bearings 34, 34ª on the damper or door frame B and is adapted to turn to a limited extent relatively to the damper in loops or bearings 35 attached to the damper, the shaft being connected to the damper through the medium of levers 36 and 37. During the first portion of the rotation of the shaft these levers will act forcibly to pry the damper out of engagement with its frame B to start the opening movement of the damper, and thereafter during the further rotation of the shaft, will swing the damper wide open. For this purpose a rocker or lever 38 is fixed on the shaft 12 and has oppositely projecting arms, one of which is linked or otherwise suitably connected to the lever 36 and the other of which is similarly connected to the second lever 37. The lever 36 is pivoted at 38ª to the damper adjacent to one edge thereof and has a short arm 39 arranged to bear against an adjacent plate or fulcrum piece 40 which is stationarily secured to, or otherwise formed on the frame of the damper opening. The other lever 37 is pivoted to the damper adjacent to its opposite edge and has a short, outer arm 41 which bears against an adjacent fixed part of the frame of the damper opening. The short arm of the lever 36 bears outwardly against its fixed fulcrum part, while the short arm of the other lever 37 bears inwardly against its fulcrum part on the frame. When, therefore, the damper-operating shaft is rocked, the first portion of the movement thereof will swing the levers 36 and 37 and forcibly pry the damper out of engagement with the contacting parts of the damper or door frame B. This independent movement of the levers 36 and 37 on the damper is limited as by contact of the long arms of the levers 36 and 37 with suitable stop parts 42 and 43 respectively on the damper so that after a relatively short, partial rotation of the shaft, further rotation of the shaft independently of the damper will be prevented, and in the further rotation of the shaft, the damper will turn therewith, thus swinging the damper wide open.

I claim as my invention:

1. In an apparatus of the character described, the combination with a movable closure member, of an actuating device for said member, and operative connections between said device and said closure member including a lever arranged to fulcrum on a stationary part adjacent to the closure member and exert force on said member to forcibly initiate movement of said closure member from its stationary position.

2. In an apparatus of the character described, the combination with a movable closure member, of an actuating motor for said member and mechanism for transmitting motion from said motor to said closure member for opening and closing the same, said mechanism including a lever arranged to fulcrum on a relatively stationary part and exert force on said closure member to forcibly initiate movement of the closure member from its stationary position.

3. In an apparatus of the character described, the combination with a movable closure member, of an actuating device for said closure member, a forcing device associated with said closure member for forcibly initiating movement of said member, and mechanism for transmitting motion from said actuating device to said closure member first through said forcing device and then independently of the forcing action of said forcing device.

4. In an apparatus of the character described, the combination with a movable closure member, of an actuating motor for said member, a lever associated with said member and arranged to bear on a stationary part, and means for applying the moving effort of the motor to said member, first through the action of said lever on said stationary part to forcibly start the member, and then independently of said forcing action of the lever.

5. In an apparatus of the character described, the combination with a movable closure member, of an actuating device for said member, a lever pivoted to said member and having a portion arranged to bear on a stationary part, and means operated by said actuating device for first moving said lever relatively to the closure member to initiate movement of the member and then with the closure member.

6. In an apparatus of the character described, the combination with a movable closure member, of a pressure actuated motor for moving the closure member in one direction including a movable head, a plurality of bellows disposed on opposite sides of said head, said bellows all tending to expand under the influence of pressure therein to move the closure member in one direction, and spring mechanism acting in opposition to said pressure whereby when the pressure in said bellows falls below a predetermined point it permits the spring mechanism to operate said closure member in the opposite direction.

7. In an apparatus of the character described, the combination with a movable closure member, of a pressure actuated mechanism for operating the movable member in one direction including a movable head, a stationary head and a movable intermediate head, sets of bellows arranged on opposite sides of said intermediate head, the ends of one set of said bellows bearing against the movable head and the ends of the other set bearing against said stationary head, said bellows being in communication with one another through the intermediate movable head and all tending to expand under the influence of pressure created therein, and spring mechanism acting in opposition to said pressure whereby when the pressure in said bellows falls below a predetermined point said spring mechanism operates to move the closure member in the opposite direction.

8. In an apparatus of the character described, the combination of a movable member, a rock shaft on which said movable member is mounted, and which has a limited movement relatively to said member, a lever connected to said shaft and pivoted near one end on said member, the free end of said lever being arranged to engage a stationary part, and an actuating device for operating said rock shaft to move the free end of said lever into engagement with said stationary part to initiate movement of the movable member and finally move the lever into engagement with a part of said movable member to complete the movement of said member.

9. In an apparatus of the character described, the combination with a movable closure member, of a motor and means operated by said motor for moving said closure member, said means being arranged to initially exert its force on said closure member by a lever action fulcrumed on a stationary part and then exert its force directly on said member.

10. In an apparatus of the character described, the combination with a movable closure member, of a motor, a lever operated by said motor for moving said closure member, said lever being mounted on said closure member and arranged initially to bear against a stationary fulcrum and on said closure member to start the movement of said member and finally to bear directly on said closure member to continue the movement of said member.

11. In an apparatus of the character described, the combination with a movable closure member, of a shaft supporting said member, a lever mounted on said member and having one end connected to said shaft and its opposite end arranged to initially bear against a stationary part when its opposite end is operated by said shaft, and a motor for operating said shaft.

12. In an apparatus of the character described, the combination with a movable closure member, of operating means therefor including a lever pivoted on said member and having a portion initially bearing on a stationary part, and means for first causing said lever to move relatively to the member and rock against said stationary part and to finally bear directly on a part of said member.

13. In an apparatus of the character described, the combination with a movable closure member, of a rock shaft having a lost motion connection therewith, a lever pivoted on said member having a portion arranged to bear on a stationary part, and a rock arm mounted on said shaft and connected to said lever for actuating the lever.

14. In an apparatus of the character described, the combination with a centrally pivoted swinging closure member, a pivot shaft member for said closure member having a lost motion connection therewith, a pair of levers pivoted near the opposite edges of said closure member, and arranged to bear at their free ends on stationary parts, said levers being connected with said shaft, and means for rocking said shaft to first actuate said levers to forcibly start the closure member and then swing the closure member.

WILLIS H. CARRIER.